(12) United States Patent
Dassler et al.

(10) Patent No.: US 10,184,702 B2
(45) Date of Patent: Jan. 22, 2019

(54) ADSORPTION MODULE

(71) Applicant: SORTECH AG, Halle/Saale (DE)

(72) Inventors: Ingo Dassler, Halle (DE); Walter Mittelbach, Freiburg i. B. (DE)

(73) Assignee: SORTECH AG, Halle/Saale (DE)

( * ) Notice: Subject to any disclaimer, the term of this patent is extended or adjusted under 35 U.S.C. 154(b) by 96 days.

(21) Appl. No.: 14/907,627

(22) PCT Filed: Jul. 28, 2014

(86) PCT No.: PCT/EP2014/066135
§ 371 (c)(1),
(2) Date: Jan. 26, 2016

(87) PCT Pub. No.: WO2015/014772
PCT Pub. Date: Feb. 5, 2015

(65) Prior Publication Data
US 2016/0161159 A1 Jun. 9, 2016

(30) Foreign Application Priority Data

Jul. 31, 2013 (DE) .......... 10 2013 012 792
Jul. 25, 2014 (DE) .......... 10 2014 110 509

(51) Int. Cl.
*F25B 35/04* (2006.01)
*F25B 17/08* (2006.01)
(Continued)

(52) U.S. Cl.
CPC .............. *F25B 35/04* (2013.01); *F25B 17/08* (2013.01); *F25B 17/086* (2013.01); *F25B 37/00* (2013.01);
(Continued)

(58) Field of Classification Search
CPC .......... B60H 3/00; B60H 1/12; B60H 3/0658; B60H 2003/0675; A61L 9/205;
(Continued)

(56) References Cited

U.S. PATENT DOCUMENTS 6,043,177 A * 3/2000 Falconer ............ B01D 67/0093
423/111
7,251,955 B2 8/2007 Henning .................. 62/480
(Continued)

FOREIGN PATENT DOCUMENTS

DE 198 18 807 10/1999 .............. B60H 1/32
DE 10 2007 012 113 9/2008 .............. F25B 17/08
(Continued)

OTHER PUBLICATIONS

The Notification Concerning Transmittal of International Preliminary Report on Patentability (Chapter I of the Patent Cooperation Treaty), in English, dated Feb. 11, 2016, the International Preliminary Report on Patentability (Chapter I of the Patent Cooperation Treaty), in English, dated Feb. 2, 2016, the Written Opinion of the International Searching Authority, in English, dated Nov. 12, 2014, and the International Search Report, in English, dated Nov. 12, 2014, which were issued by the International Bureau of WIPO in Applicant's corresponding international PCT application having Serial No. PCT/EP2014/066135, filed on Jul. 28, 2014.

*Primary Examiner* — Emmanuel Duke
(74) *Attorney, Agent, or Firm* — Bodner & O'Rourke, LLP; Gerald T. Bodner; Christian P. Bodner

(57) ABSTRACT

The invention relates to an adsorption module, consisting of at least one sorption unit and at least one evaporator/condenser unit, each with inlet and outlet ports for a fluid heat transfer medium, said units being in the same or separate vacuum-tight housings. According to the invention
(Continued)

the housing is flat and can be joined to multiple flat housings in a stacked arrangement with a common steam duct.

13 Claims, 4 Drawing Sheets

(51) Int. Cl.
  *F25B 37/00* (2006.01)
  *F25B 39/02* (2006.01)
  *F25B 39/04* (2006.01)
(52) U.S. Cl.
  CPC .......... *F25B 39/024* (2013.01); *F25B 39/026* (2013.01); *F25B 39/04* (2013.01); *Y02A 30/276* (2018.01); *Y02A 30/278* (2018.01); *Y02B 30/64* (2013.01)
(58) Field of Classification Search
  CPC ...... A61L 9/00; A61L 2/00; A61L 9/20; F25B 35/04; F25B 17/08; F25B 17/086; F25B 39/024; F25B 39/026; Y02B 30/64
  See application file for complete search history.

(56) References Cited

U.S. PATENT DOCUMENTS

| | | | |
|---|---|---|---|
| 8,578,732 B2 | 11/2013 | Büttner et al. | 62/478 |
| 8,806,883 B2 | 8/2014 | Burk et al. | 62/324.6 |
| 2006/0101847 A1* | 5/2006 | Henning | F25B 17/08 62/480 |
| 2010/0293989 A1* | 11/2010 | Buttner | F25B 17/083 62/478 |
| 2014/0223955 A1* | 8/2014 | Schiehlen | F25B 17/08 62/476 |

FOREIGN PATENT DOCUMENTS

| | | | |
|---|---|---|---|
| WO | WO 03/087682 | 10/2003 | .............. F25B 17/08 |
| WO | WO 2007/068481 | 6/2007 | .............. F25B 17/08 |

\* cited by examiner

ADSORPTION MODULE

The invention relates to an adsorption module comprised of at least one sorption unit and at least one evaporator/condenser unit, each with ports for feeding and discharging a fluid heat transfer medium, said units being located in separate or a common vacuum-tight housing(s), according to the preamble of claim 1.

From DE 10 2007 012 113 A1, a compact sorption cooling unit is already known comprising at least one adsorber-desorber unit having a heat exchanger and sorption material, as well as at least one condenser-heat exchanger and at least one evaporator-heat exchanger. The building blocks cited above are located in a common, vacuum-tight metal outer housing. Furthermore, connection and coupling elements and pipe ducts for the hydraulic interconnection and operation of the unit are present.

The already known solution is aimed at a sandwich structure, wherein the at least one adsorber-desorber unit is located in an inner or partial inner housing.

From the aforementioned, it is a task of the invention to propose a further developed adsorption module for multifunctional application in the field of refrigeration technology which has optimum heat integration and can be joined together to an aggregate according to the respective case of application, resulting in an increase of energy efficiency according to equipped sorption units for heat or cold generation, respectively storage. The relevant manufacturing technology should be optimized so that the manufacturing costs of corresponding adsorption modules can be decreased as compared to the state of the art.

The solution of the inventive task is effected by an adsorption module according to the feature combination as per claim 1, the dependent claims at least representing appropriate configurations and improvements.

Accordingly, an adsorption module comprised of at least one sorption unit and at least one evaporator/condenser unit having respective ports for feeding and discharging a fluid heat transfer medium, said unit being located in separate or a common vacuum-tight housing(s), is taken as a basis.

The adsorption module according to the invention is realized according to the design of a plate heat exchanger, i.e. the housing is formed to be plate-shaped. A plurality of plate-shaped housings can be joined to a stacked arrangement which comprises a common steam duct.

The housings may be realized as monolithically cast modules having ordered flow passages, or even as monolithically cast, porous structures.

Modules of an aluminum sponge-like material or modules generated in a sintering process are further conceivable.

Hence, there is the sorption unit of a monolithically cast or sintered, three-dimensional metallic, optionally aluminum structure having a plurality of breakthroughs oriented in the flow passage direction of the heat transfer medium.

The sorption unit is coated with zeolite or other adsorbents.

In a preferred embodiment, a zeolite coating is realized by in situ crystallization. In this case, atoms are extracted from the metal substrate in a targeted manner and incorporated in the zeolite layer.

In an embodiment of the invention, the adsorption module comprises an assembly including in each case at least one sorption unit or at least one evaporator/condenser unit, each having an integral steam duct which can be joined to a continuous duct when a stacked arrangement is formed.

For output scaling, a variation of the number of plate-shaped housings within the stacked arrangement may be performed.

The metallic structure of the sorption unit is quasi implemented directly as an integral part of the actual housing in a single manufacturing process, for example a casting or sintering process so that a long-term stable heat transfer is given by avoiding additional connecting steps such as adhesive bonding, welding, soldering, screwing or similar. The structures of the breakthroughs may be freely selected, and namely due to the preferred casting or sintering technology.

In a further embodiment of the invention, the plate-shaped housing is made of sheets of metal. The sheets of metal preferably comprise stamped, cam-like protrusions. At least one pair of sheet metals having protrusions facing each other is then joined to a housing such that a space is generated for the heat transfer medium. In this respect, the protrusions form spacers between the metal sheets. Since the protrusions are not realized to be in lines, rather merely in points, e.g. in the form of truncated cones or truncated pyramids, the heat transfer medium may flow unhindered in the corresponding space and get in contact with the sheet metals. The number and type of stampings, i.e. of the protrusions, serves in this respect not only the purposes of securing the sheet metals' mutual position but also of enhancing and improving the heat transfer between the sheet metals and the heat transfer medium or vice versa.

In a further embodiment, the plate-shaped housings are made of open, profiled plates joined together in pairs. The profiled plates have a substantially U-shaped cross-section. The U-legs of the respective profiled plates are oriented toward one other and form a joined portion at the leg end. The connection of the profiled plates may be performed for example in a material bonding manner, i.e. by means of adhesive bonding, soldering or welding, or else in a force-fitting manner using an inserted sealing and clamp-like fastening members.

Due to the U-shaped profiled plates being oriented toward one another, here as well a space is generated for the heat transfer medium.

The areas of the profiled plates getting in contact with the heat transfer medium may have a surface-enlarging structuring that improves the heat transfer characteristics.

The areas not getting in contact with the heat transfer medium may be provided with a porous coating.

In a supplementary embodiment, the plate-shaped housings are comprised of an extruded profile. The extruded profile comprises a plurality of ducts for forming a space for the heat transfer medium.

At least one of the housings' external sides of the respective plate-shaped housings may have a ribbing or similar surface-enlarging structure for improved heat exchange with the environment.

The invention will be explained below in more detail by means of an exemplary embodiment as well as based on the figures.

Shown are in:

FIG. 1 a first embodiment of the module according to the invention in a side view and a top view, and FIG. 2 a second embodiment in a side view and top view, in which the steam duct of the single module is open and can be joined to a closed steam duct in a stacked arrangement of several modules.

Figure 1:
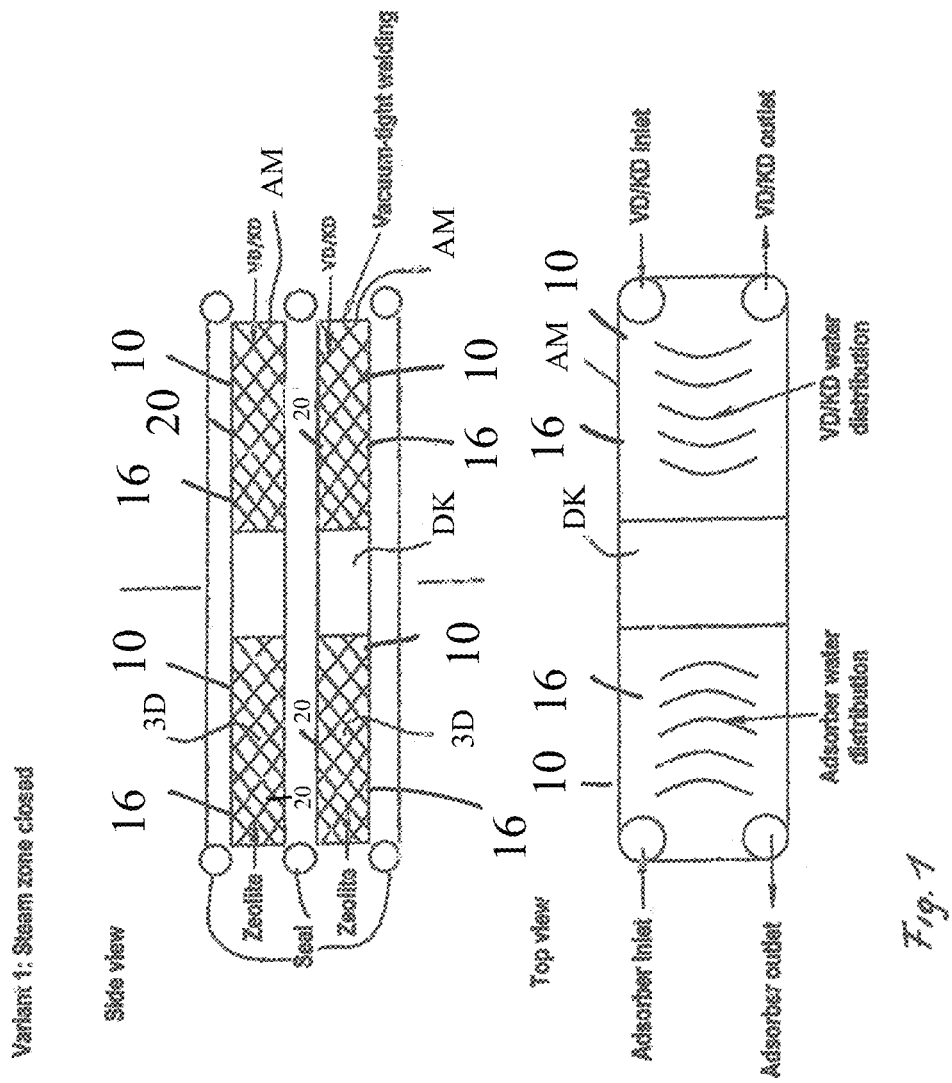

The idea on which the invention and consequently the exemplary embodiments is/are based is to make the plate-shaped housing itself to become an active component of the adsorption module to the extent that at least parts of the housing are an integral part of the sorption unit. Only connections for the heat transfer medium remain to be connected to the module, and in a stacked arrangement such as shown, for instance, in the side view as per FIG. 1, sealing means need to be provided so that the steam duct DK is formed.

The single adsorption module AM is made of a plate-shaped housing, with the metallic structure of the sorption unit being formed in one piece with the housing, e.g. in the form of a cast or sintered part.

In this respect, the housing of the adsorption module AM may be made of an aluminum material which, starting from the external side, merges in such a structure 20 which comprises a plurality of breakthroughs 14 oriented in the flow passage direction of the heat transfer medium. VD/KD indicates the evaporator, respectively condenser in the figures. The water distribution for the evaporator and condenser is symbolized by curved lines in the top view as per FIG. 1. The representations according to the exemplary embodiment are based on the fact that a zeolite layer as an absorbent crystallized preferably in situ has been applied onto the three-dimensional structure.

Figure 2:
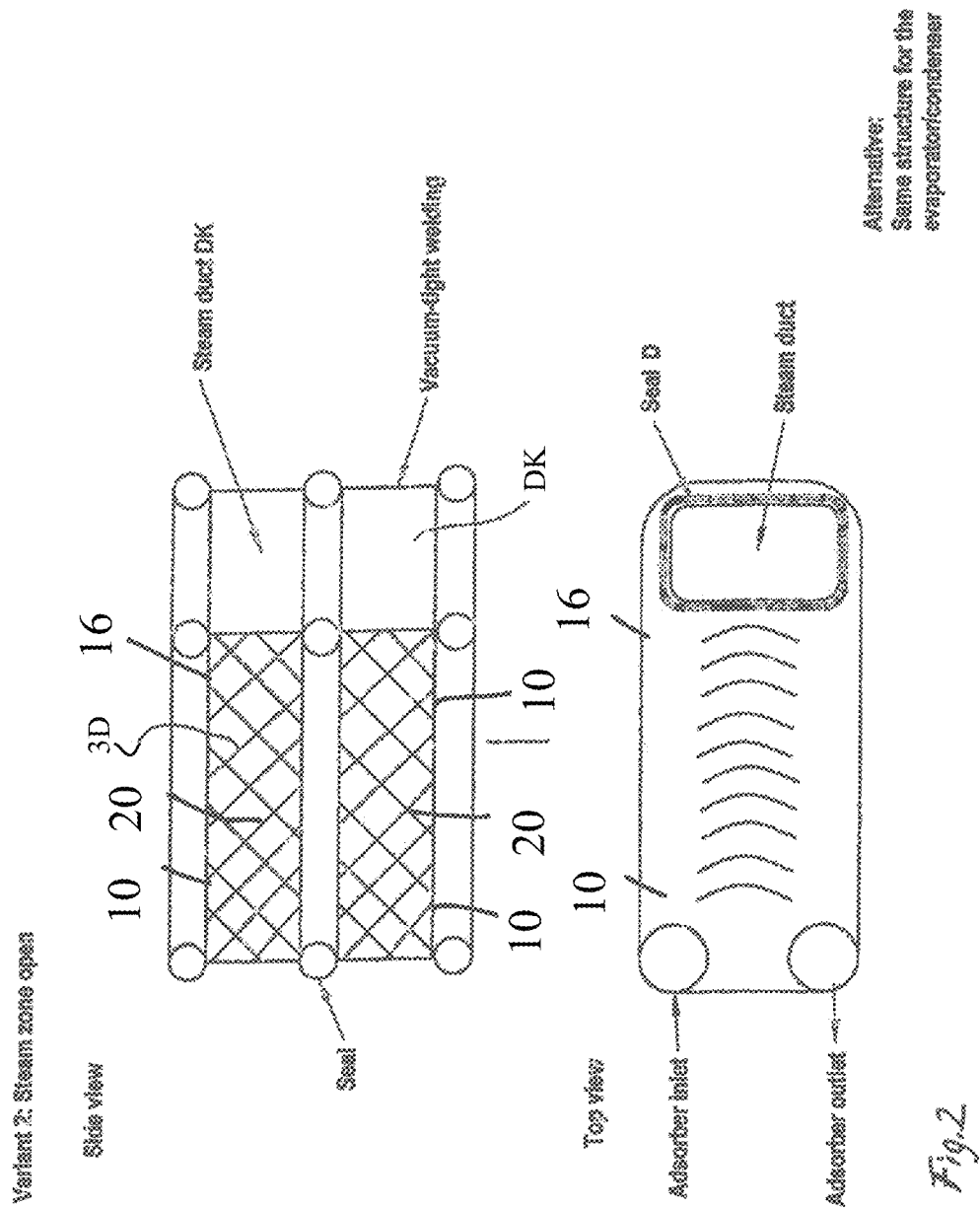
Figure 3:
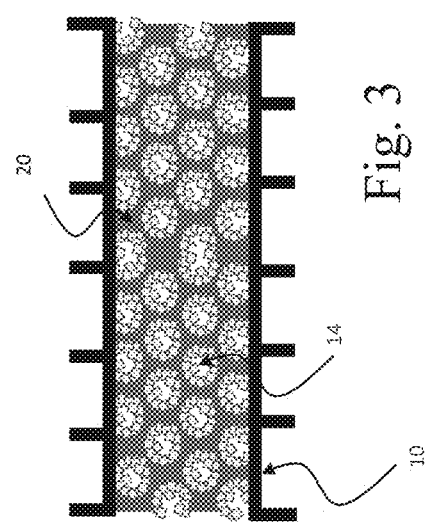
FIG. 3 is a cross-sectional view of the module formed in accordance with one form of the present invention, showing the breakthroughs oriented in the flow passage direction of the heat transfer medium.
Figure 7:
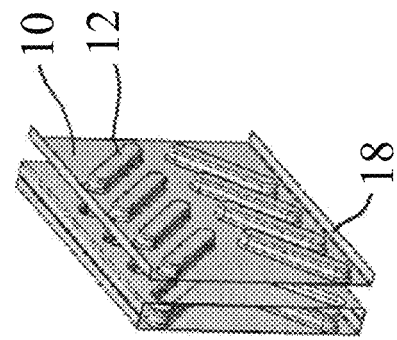
FIG. 7 is a front, bottom perspective view of the housing of the adsorption module formed in accordance with one form of the present invention, showing the plates forming the housing joined together.
Figure 4:
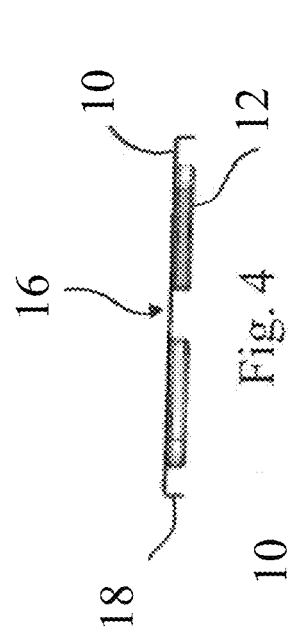
FIG. 4 is a front elevational view of the housing of the adsorption module formed in accordance with one form of the present invention.
Figure 5:
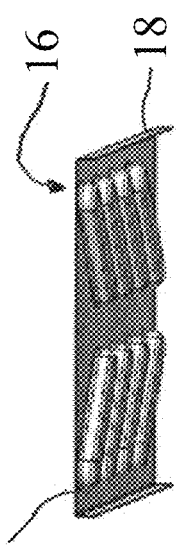
FIG. 5 is a front, bottom perspective view of the housing of the adsorption module formed in accordance with one form of the present invention.
Figure 6:
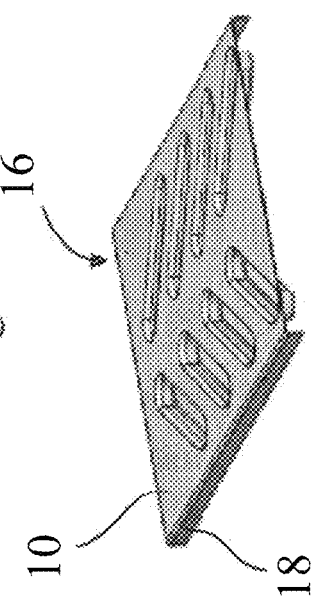
FIG. 6 is a front, top perspective view of the housing of the adsorption module formed in accordance with one form of the present invention.

In the embodiment of an adsorption module as per FIG. 2, each single module is open relative to the steam duct DK. When a stacked arrangement (see side view as per FIG. 2) is realized, the steam ducts DK are superimposed for forming an steam duct which is then continuous, with a sealing D being arranged between the individual steam ducts of the respective module.

The single modules may be realized as monolithically cast, ordered aluminum modules but also as monolithically cast, porous aluminum modules. Moreover conceivable are cast aluminum sponge modules or sintered aluminum modules of spheres, powder or fibers.

By means of the inventive technology, chillers or heat pumps, yet also cold or heat accumulators can be realized using the adsorption modules, with the embodiment as per FIG. 2 being predestined for heat accumulators.

In further exemplary embodiments, there is the option of realizing the plate-shaped housings from single metal sheets 16, wherein the metal sheets 16 have a nub-like, stamped structure in the form of single or group-like arranged protrusions 12. In each case at least one pair of metal sheets 16 having protrusions 12 facing each other are then joined to a housing, e.g. by pressing or in a material bonding manner, such that a space for the heat transfer medium is generated and the protrusions 12 form spacers between the metal sheets 16 in this respect. Thus, the protrusions 12 are attributed a stabilizing function of the respective plate-shaped housings, on the one hand. On the other, the nubs fulfil the function of enlarging the area which is decisive for the heat transfer. If required, the metal sheets 16 can be coated directly with a zeolite material.

The housing may moreover be comprised of open, relatively rigid profiled plates 10 joined together in pairs.

The profiled plates 10 have a substantially U-shaped cross-section with short U-legs 18 and connecting legs formed to be relatively wide. The U-legs 18 of one pair of profiled plates 10 are oriented toward one another and represent a joined portion such that a space for the heat transfer medium is generated.

The areas of the profiled plates 10 getting in contact with the heat transfer medium may have a surface-enlarging structuring, e.g. produced by milling or etching.

In a likewise designed option, the plate-shaped housings may be manufactured from extruded profiles in a relatively cost-efficient manner. The extruded profile forming the respective housing has in this case a plurality of ducts for forming a space for the heat transfer medium.

At least one external side of the housing may have a ribbing for improving the heat transfer to the environment.

The individual housings according to the exemplary embodiments described above may then be joined to an entire module and enclosed by a vacuum-tight envelope. Corresponding connections for the heat transfer medium may be realized in a known manner.

The modules formed from several plate-shaped housings may be provided individually or collectively with a coating on the vacuum side in the form of an open-pored sponge-like aluminum body. The coating may also be realized as a monolithic block and then be connected to the plate-shaped housing(s) in a material bonding or form-fitting manner. A preferred variant is to coat the porous part on the vacuum side with zeolite and subsequently to establish a material-bonded connection, e.g. by soldering to the hydraulic part, i.e. the module part receiving the heat transfer medium.

The invention claimed is:

1. Adsorption module comprised of at least one sorption unit and at least one evaporator/condenser unit having respective ports for feeding and discharging a fluid heat transfer medium, said units being located in a common vacuum-tight housing(s),
whereby
the housing is formed to be plate-shaped, and a plurality of plate-shaped housings can be joined to a stacked arrangement which comprises a common steam duct;
wherein
at least parts of the housing are an integral part of the sorption unit,
at least the sorption unit is comprised of a monolithically cast or sintered three-dimensional metallic structure having a plurality of breakthroughs, each of the breakthroughs having a structure associated therewith,
wherein a zeolite layer is located on the three dimensional structure, whereby the zeolite layer is in close contact with the three-dimensional structure,
wherein the zeolite layer is crystallized in situ and
the metallic structure is an integral part of the respective plate-shaped housing.

2. The adsorption module according to claim 1,
wherein
the plate-shaped housings are made of metal sheets, wherein the metal sheets have nub-like, stamped protrusions, and in each case at least one pair of metal sheets having protrusions facing each other is connected into the housing such that a space for the heat transfer medium is generated and the protrusions form spacers between the metal sheets.

3. The adsorption module according to claim 1, wherein
the plate-shaped housings are made of open, profiled plates joined together in pairs, wherein the profiled plates have a substantially U-shaped cross-section, the U-legs are oriented toward one other and form a joined portion such that a space for the heat transfer medium is generated, wherein areas of the profiled plates getting in contact with the heat transfer medium have a surface-enlarging structure.

4. The adsorption module according to claim 3, wherein
at least one external side of the housing has a ribbing or similar structure for enlarging the surface.

5. The adsorption module according to claim 1, wherein
the plate-shaped housings are made of an extruded profile having a plurality of ducts for forming a space for the heat transfer medium.

6. The adsorption module according to claim 1, the plurality of breakthroughs are oriented in a flow passage direction of the heat transfer medium.

7. The adsorption module according to claim 6, wherein
the monolithic three-dimensional cast or sintered metallic structure is formed of aluminum.

8. The adsorption module according to claim 7, wherein
the structure is realized as a cast or sintered body having the plurality of breakthroughs.

9. The adsorption module according to claim 8, wherein
the cast or sintered body comprises molded collectors, heat transfer medium guiding means, tubes or similar.

10. The adsorption module according to claim 1, wherein an assembly including the at least one sorption unit or the at least one evaporator/condenser unit each having an integral steam duct portion which can be joined to a continuous duct when a stacked arrangement is formed.

11. Cold accumulator or heat accumulator comprising at least one adsorption module according to claim 10.

12. The adsorption module according to claim 1, wherein
the zeolite structure represents a microporous silico-alumino-phosphate (SAPO) material, a microporous aluminum phosphate (ALPO) material or a microporous metal aluminum phosphate (Mi-ALPO) material and comprises crystals oriented in their main and growth directions substantially perpendicular to the surface of the metallic structure.

13. Chiller or heat pump comprising at least one adsorption module according to claim 1.

* * * * *